United States Patent [19]

Koziol

[11] Patent Number: 4,561,419
[45] Date of Patent: Dec. 31, 1985

[54] ADJUSTABLE BURNER ASSEMBLY

[75] Inventor: Walter Koziol, Antioch, Ill.

[73] Assignee: Modern Home Products Corp., Antioch, Ill.

[21] Appl. No.: 601,546

[22] Filed: Apr. 18, 1984

[51] Int. Cl.[4] .............................................. F24C 3/00
[52] U.S. Cl. .............................. 126/41 R; 126/39 E; 239/565
[58] Field of Search ............... 126/25 R, 25 A, 25 C, 126/39 E, 40, 41 R, 39 R, 39 A, 39 B, 39 C, 39 D, 39 F, 39 G, 39 H, 39 N, 39 J, 39 K, 39 L; 431/278, 279, 186, 286, 355; 239/536, 565, 566, 587

[56] References Cited

U.S. PATENT DOCUMENTS

| | | | |
|---|---|---|---|
| 1,215,653 | 2/1917 | Hale | 126/39 N |
| 1,791,565 | 2/1931 | Killam | 431/355 |
| 3,169,573 | 2/1965 | Hidaka | 126/39 R X |
| 3,301,306 | 1/1967 | Finley et al. | 431/355 |
| 3,638,635 | 2/1972 | Drennan | 126/41 R |
| 4,092,975 | 6/1978 | Grammatopoulos | 126/41 R |
| 4,267,816 | 5/1981 | Koziol | 126/41 R |
| 4,373,505 | 3/1984 | Koziol | 126/39 E |
| 4,462,384 | 7/1984 | Hitch | 126/41 R |

FOREIGN PATENT DOCUMENTS

| | | | |
|---|---|---|---|
| 612444 | 4/1935 | Fed. Rep. of Germany | 126/394 |
| 68560 | 6/1915 | Switzerland | 126/39 R |
| 517720 | 2/1940 | United Kingdom | 239/556 |

Primary Examiner—Margaret A. Focarino
Attorney, Agent, or Firm—Quarles & Brady

[57] ABSTRACT

A gas burner assembly for a barbecue grill which can be utilized in a wide variety of gas barbecue grill base portions. The burner element is of a generally tubular construction with telescoping hollow body members extending from a central body member in opposing directions. A gas intake member is in fluid communication with the hollow tubular body member, and a plurality of apertures are distributed over the body members. In a preferred manner, the telescoping body members have adjustable screws for locating the telescoping body members in various positions from the central body member. Also preferably, the telescoping burner members also include adjustable leg members so as to firmly position the telescoping hollow body at various positions along the floor of the barbecue grill base.

15 Claims, 9 Drawing Figures

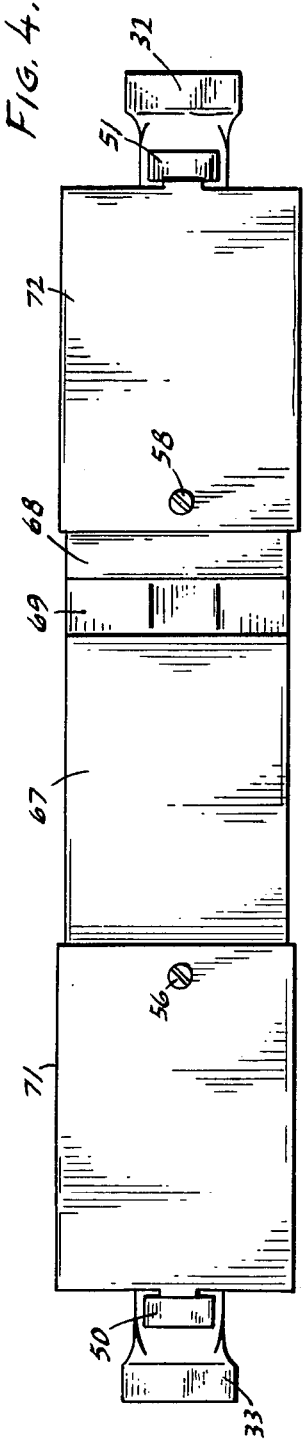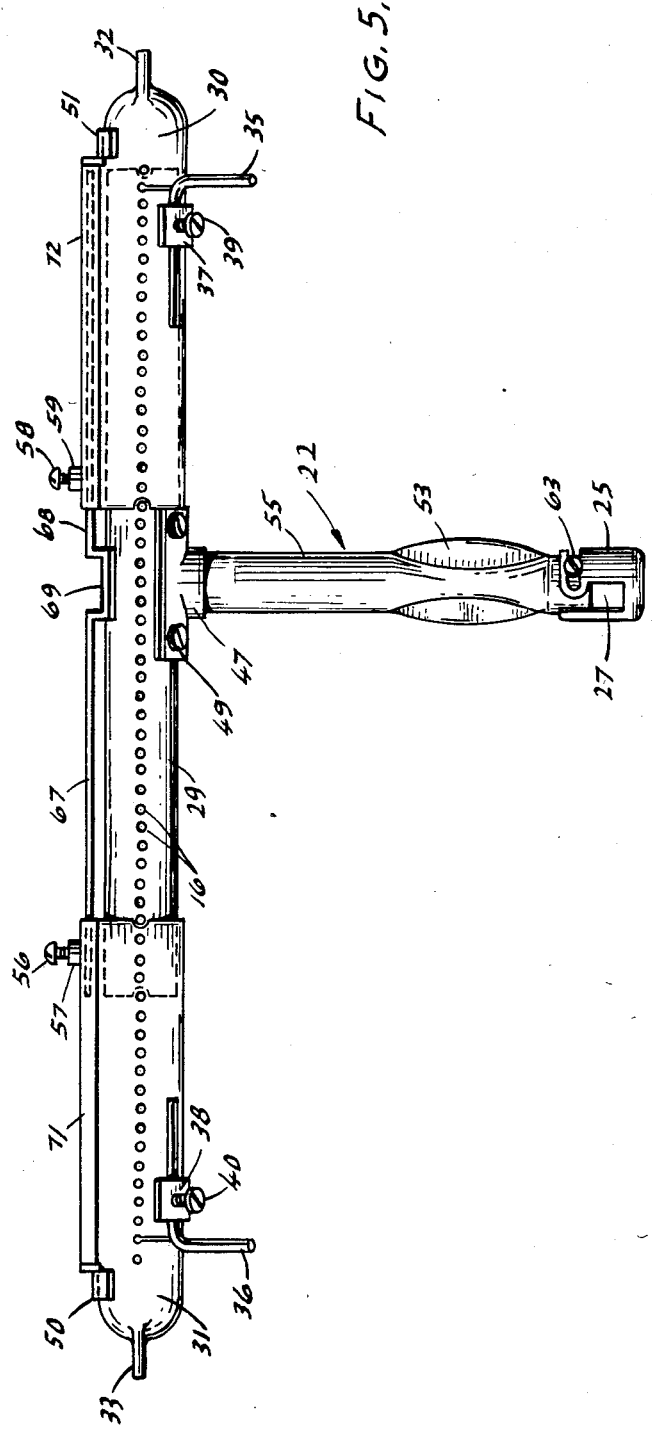

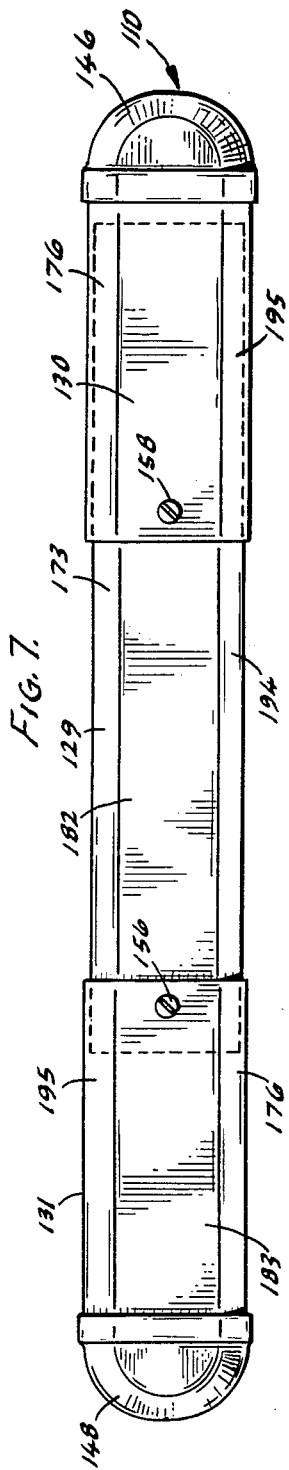
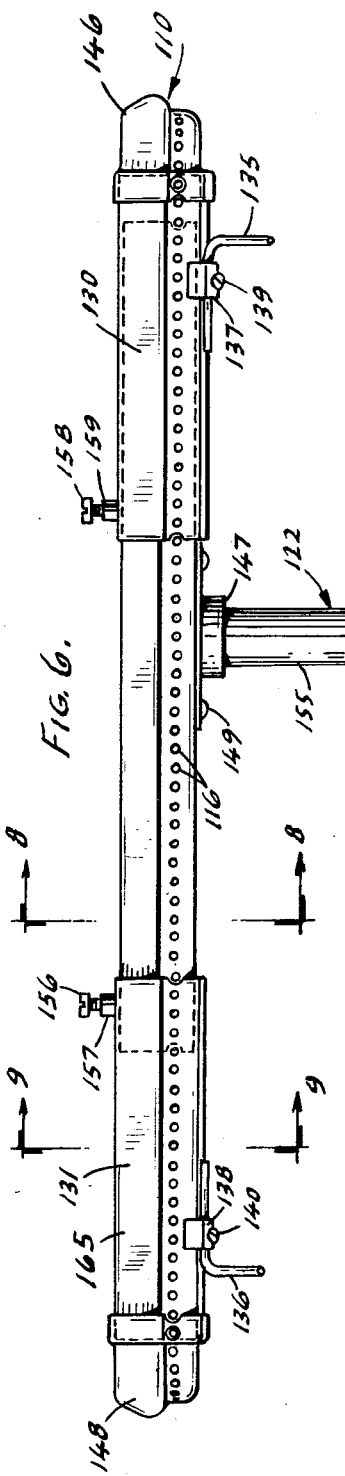
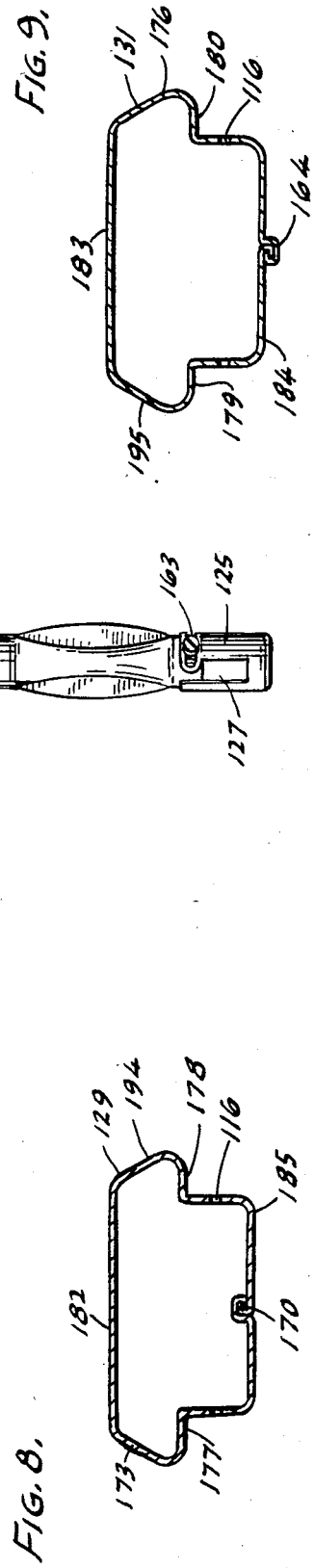

ADJUSTABLE BURNER ASSEMBLY

BACKGROUND OF THE INVENTION

This invention relates to an improved gas burner element for a gas barbecue grill. More particularly, it relates to an adjustable gas burner element wherein hollow body members are positioned in a telescoping relationship to a central hollow body member so that the burner element can be extended to fit within and to provide heat over an extensive portion of the barbecue grill base irrespective of its size.

Various barbecue grill bases have floors of varying dimensions. To obtain maximum advantage from gas grill units with the grill bases it is necessary for the burner element to extend over the greatest area in the base. Cost savings could be effected if one burner element is fabricated so as to fit in a suitable manner any barbecue base portion and extend over the maximum area while providing proper connection with a gas supply.

The state of the art for gas burners and delivery systems for barbecue grills is illustrated in U.S. Pat. Nos. 3,638,635; 4,267,816 and 4,373,505. In U.S. Pat. No. 3,638,635 a one piece, nonadjustable venturi tube 64 extends from gas valve 70 to burner 25 and is attached thereto by base 65 and screw 63. In U.S. Pat. Nos. 4,267,816 and 4,373,505 adjustable legs 35–38 are illustrated and an adjustable venturi assembly such as shown at 22 in U.S. Pat. No. 4,373,505.

It is an advantage of the present invention to provide an adjustable gas burner element for a gas barbecue grill so as to obtain maximum extension of the burner element over the base floor of the grill unit. It is another advantage of this invention to provide a novel telescoping and adjustment means between a central burner body member and additional hollow body members positioned in telescoping relationship with respect to the central body member. It is still another advantage of this invention to provide an adjustable gas burner element which will provide quick adjustment without leakage. It is yet another advantage of the present invention to provide a universal gas burner element for a gas grill which can be manufactured and assembled in an economical manner. It is still another advantage of this invention to provide an adjustable burner element which can be easily connected to a gas supply and regulating member.

SUMMARY OF THE INVENTION

The foregoing advantages are accomplished by the present burner element for a gas barbecue grill wherein the burner element is defined by a first hollow body member having a gas intake member in fluid communication with the hollow body member. A second and a third hollow body member are positioned in telescoping relationship with respect to the first hollow body member and oppositely therefrom. A plurality of apertures are distributed over the body members. In a preferred embodiment, the body members extend from each end of the first or central hollow body member in a telescoping relationship thereover. Also preferably, adjustable leg members are operatively associated with the hollow body members. Adjustable securing means are operatively positioned with respect to the second and third hollow body members for engagement with the first hollow body member to provide suitable engagement with the first hollow body member. Adjustable securing means are defined by a screw member threadably engaged through the second or third hollow body members for engagement with guide rails extending from the central hollow body member.

BRIEF DESCRIPTION OF THE DRAWINGS

A better understanding of the present adjustable burner element for a gas barbecue grill will be accomplished by reference to the drawings wherein:

FIG. 4 is a top plan view of the burner element shown in FIG 1.

FIG. 5 is a view in front elevation showing an extension of one of the hollow body members from the left side thereof.

FIG. 6 is a view similar to FIG. 5 except showing another embodiment of the invention.

FIG. 7 is a view similar to FIG. 4 except illustrating the top of the embodiment depicted in FIG. 6.

FIG. 8 is a view in vertical section taken along line 8—8 of FIG. 6.

FIG. 9 is a view similar to FIG. 8 taken along line 9—9 of FIG. 6.

DESCRIPTION OF THE PREFERRED EMBODIMENT

Figure 1:
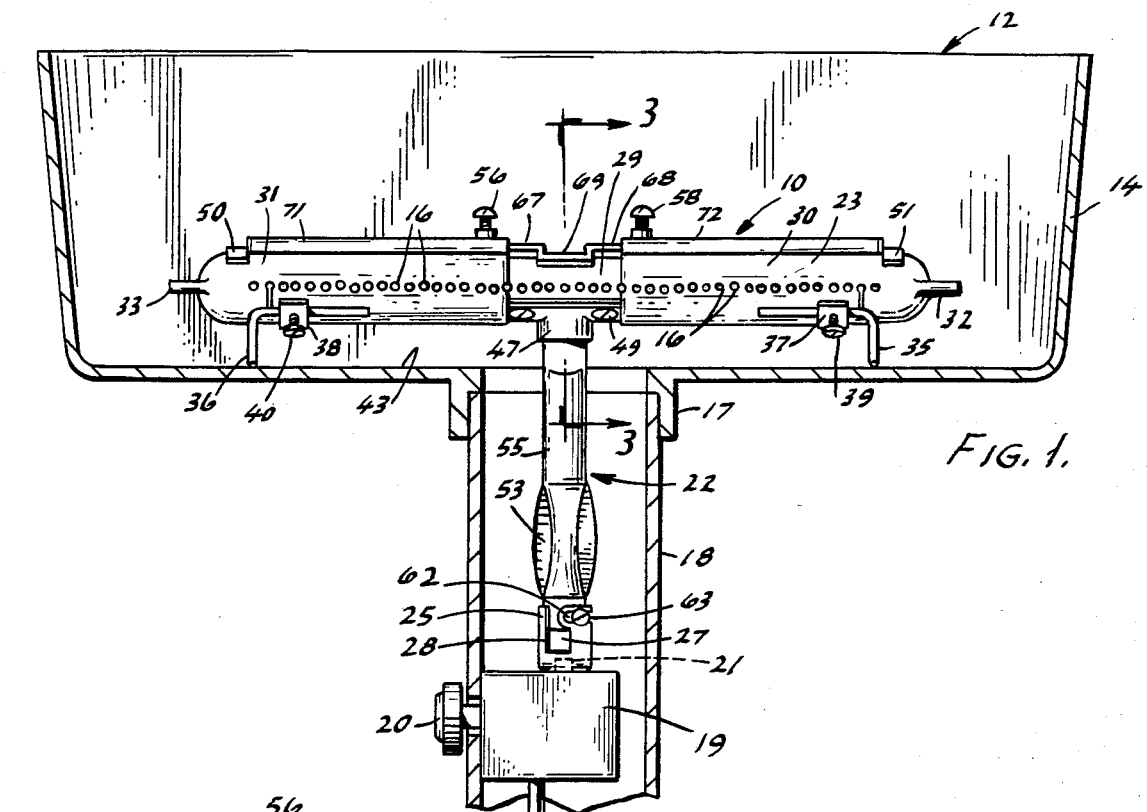
FIG. 1 is a view in front elevation illustrating the telescoping burner assembly of this invention positioned operatively in a base portion of the gas barbecue grill which is shown in vertical section.

Proceeding to a detailed description of the present invention, gas burner element generally 10 is shown specifically in FIG. 1 and is utilized in conjunction with a gas barbecue grill unit generally 12. Grill unit 12 has the usual base member 14 with a hollow post 18 in contact therewith by means of collar 17. The usual gas control 19 is housed inside post 18 with control knob 20 extending therefrom. A gas supply nozzle 21 projects from gas control 19 at one end and is in communication with rotatable air regulator 25 forming a portion of venturi tube assembly generally 22. Venturi tube assembly 22 will include gas intake conduit 55 as well as the usual finned section 53. Extending from finned section 53 is screw 63 which will ride in slot 62 of rotatable air regulator 25 for purposes of adjustment. Lateral opening 28 is provided in rotatable air regulator 25 for adjustment with lateral opening 27 in the bottom portion of venturi tube assembly 22. Gas supply line 60 provides gas to gas control 19.

Burner element 10 has a generally hollow, tubular body member 23 and includes central portion 29 and extending arm portions 30 and 31 in a telescoping relationship over central tubular portion 29. Apertures 16 extend over the central portion as well as extension tubular arm portions 30 and 31.

Figure 2:
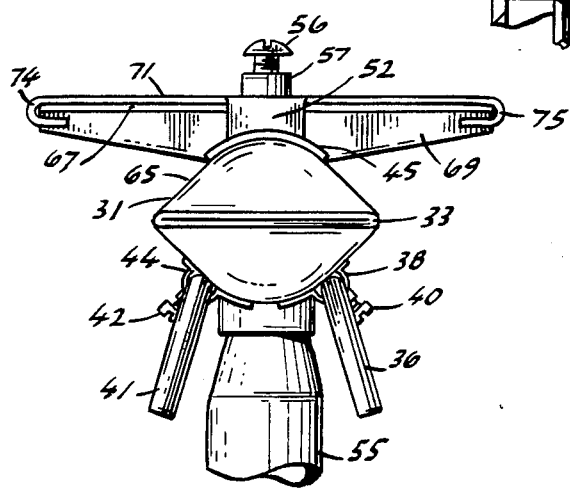
FIG. 2 is a view in side elevation of the adjustable gas burner element shown in FIG. 1 as viewed from the lefthand side.

As best seen in FIGS. 1 and 2, leg members such as 35, 36 and 41 extend from the bottom portions of extension arms 30 and 31. Leg members 35, 36 and 41 are adjustably secured to their respective extension arms 30 and 31 by means of adjustment screws such as 39, 40 and 42 threadably secured in tubular portions such as 37, 38 and 44. It will be appreciated that an additional leg member such as 35 will be positioned oppositely and in a paired manner on extension arm 30 as indicated for legs 36 and 41. The adjustable leg members are the subject matter of U.S. Pat. No. 4,267,816.

Figure 3:
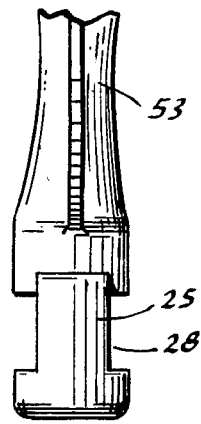
FIG. 3 is a view in vertical section taken along line 3—3 of FIG. 1.

As best seen in FIGS. 2–5, a telescoping means is provided between central portion 29 and extension arms 30 and 31. This is afforded by a central support flange 69 from which extend in opposing directions over the top of central portion 29, guide plate portions 67 and 68. Extension arms 30 and 31 have catch plate portions 71 and 72 for slidable engagement with guide plate portions 67 and 68, respectively, to give the tubular extensions a generally T-shape in cross-section. As best seen in FIG. 3, support flange 69 is secured to central portion 29 by means of arcuate section 45 which will be attached to central portion 29 such as by welding, riveting or with screws, with welding being preferred. It will be seen that adjustable securement between catch plate portions 71 and 72 and guide plate portions 67 and 68, respectively, is provided by screws 56 and 58 threadably secured through nuts 57 and 59, respectively. Extension arms 30 and 31 are closed at the ends opposite central portion by end portions 32 and 33. Also, fastening portions 50 and 51 provide the means for attachment of catch plate portions 71 and 72, respectively, to extension arms 31 and 30 such as through vertical section 52.

Another embodiment 110 of the invention is depicted in FIGS. 6–9. Similar numbers are employed to designate similar parts with respect to embodiment 10 except that they are in "100" series. The major difference between embodiment 10 and 110 is the absence in embodiment 110 of the upper catch plates 71 and 72 and guide plate portions 67 and 68. Instead, burner extension arms 130 and 131 as well as central portion 129 are formed in a generally T-shaped configuration with flat top walls 183 and 182. In the instance of extension arm 131 as well as arm 130 shoulders 195 and 176 extend downwardly from top wall 183 and are joined to the main body 184 through lateral portions 179 and 180. Apertures 116 will extend through main body 184 below lateral portions 179 and 180. It will be particularly noted that main body 184 of burner arm portion 131 is joined together by external seam 164. Central portion 129 has a configuration similar to arm portion 131 except smaller in cross-section so as to telescope within arm portion 131. It has an internal joining seam 170 rather than an external one for this purpose. Similarly, it has shoulders 173 and 194 joining main body 185 by lateral portions 177 and 178. Another distinction between burner elements 10 and 110 is in the provision of end caps 146 and 148 for extension arms 130 and 131, respectively.

FABRICATION AND OPERATION

The fabrication and operation of burner elements 10 and 110 are similar so only the description of burner element 10 will be made except where there are major differences. Burner element 10 with central portion 29 and extension arms 30 and 31 will be fabricated from tubular steel. Gas intake conduit 55 will be connected to central portion 29 in fluid tight manner by means of flange 47 and screws 49 in the usual manner. For shipping purposes, extension arms 30 and 31 will be positioned inwardly toward central portion 29 in the manner indicated in FIG. 1. Operative placement of burner assembly 10 in a base grill unit 12 is easily accomplished simply by means of positioning venturi tube assembly 22 on gas control 19 with gas supply nozzle 21 positioned therein. In order to maximize the heating capacity of burner unit 10 in a barbecue gas grill, all that is required is to extend extension arms 30 and 31 over central portion 29 with catch plate portions 71 and 72 riding over guide plate portions 67 and 68 in a telescoping manner. Adjustable securement is afforded at the desirable position by tightening screws 56 and 58 through nuts 57 and 59 against their respective guide plate portions 67 and 68. Burner unit 10 will be supported in base member 14 by suitably adjusting legs such as 35, 36 and 41 on floor 43.

An important aspect of this invention is the fact that extension arms 30 and 31 can be suitably extended over central portion 29 in a fast and easy manner so as to accommodate various sizes of barbecue base members such as 14. Fast adjustment is made through screws 56 and 58 as well as stable support by means of leg members 35, 36 and 41. Simplified construction is afforded without the use of sealing and gasket materials or the need to provide close tolerances between the telescoping members. The gas burner element of this invention is easily fabricated with a minimum number of parts and is assembled at a minimum amount of cost.

A further important feature of embodiment 10 is the multiple functions provided by catch plate portions 71 and 72 and plate portions 67 and 68. In addition to affording a telescoping mechanism, catch plate portions 71 and 72 as well as plate portions 67 and 68 can provide a heat shield and flame spreading element for the associated burner extension arms 31 and 30. Additionally, these portions afford a grease shield to reduce the incidence of grease clogging apertures. The heat shield, flame spreading and grease shield feature is of greater importance where a round or tubular telescoping burner is utilized. This is particularly true where the tubular or rounded telescoping burner arms such as 30 and 31 are to be used in a barbecue unit having a wide base portion where flame spreading is important. In the instance of burner element 110 where a telescoping burner of a T-shaped configuration or one having a lip is employed, the arm of the "T" or the lip can serve these functions. It should be pointed out that another difference between burner units 10 and 110 is the provision of end caps 146 and 147 to close burner arm extensions 130 and 131.

Barbecue grill base member 14 as well as post 18 are made of cast aluminum. Venturi tube assemblies 22 and 122 are made from steel as are the burner elements 10 and 110. If desired, both elements can be and usually are chrome-plated. Screws 56, 58 and 156, 158 are of the machine type. The central portion 29 and arm portions 30 and 31 can be of a rounded configuration and formed from a ready fabricated tube or these portions can be fabricated in two sections and joined by fastening seams 164 and 170 as indicated in burner unit 110.

While burner elements 10 and 110 have been illustrated in the preferred form as having two extension arms 30, 31 and 130, 131, one such arm could be provided if desired with adjustable leg members positioned on said central portion and the one extension arm. Alternatively, a multiplicity of central portions could be fabricated in a radial manner with each radial arm having an extension arm such as 31 or 131.

It will thus be seen that with the present invention there is now provided a burner unit which is fabricated to fit numerous types of barbecue grill base units irrespective of their size by means of adjustable securing means between the extension arms and the central portion. The burner unit is easily connected to a gas supply in a stable manner in the barbecue base unit. Additionally, the burner assembly is stabilized in the barbecue grill unit base with the use of adjustable leg members. Simplicity of construction is afforded without the involvement of various parts and components.

The foregoing invention can now be practiced by those skilled in the art. Such skilled persons will know that the invention is not necessarily restricted to the particular embodiments presented herein. The scope of the invention is to be defined by terms of the following claims as given meaning by the preceding description.

I claim:

1. A burner element for a gas barbecue grill comprising:
   a first hollow body member;
   a gas intake member in fluid communication with said hollow body member;
   a second hollow body member positioned in telescoping relationship with respect to said first hollow body member;
   a third hollow body member positioned in telescoping relationship with respect to said first hollow body member and opposite said second body member, said first, second and third hollow body members including means to effect said telescoping relationship; and
   a plurality of apertures distributed over each said body member.

2. The burner element as defined in claim 1 further including adjustable leg member means operatively associated with both said second and third hollow body members.

3. The burner element as defined in claim 1 further including adjustable securing means operatively associated with said second and third hollow body members and said first hollow body member.

4. The burner element as defined in claim 3 wherein said adjustable securing means is defined by a screw member threadably engaged through said second and third hollow body members.

5. The burner element as defined in claim 1 wherein said first, second and third hollow body members are defined by tubular portions.

6. The burner element as defined in claim 5 wherein said tubular portions are of a generally T-shaped configuration.

7. A burner assembly for a gas barbecue grill comprising:
   a first hollow body member;
   a gas intake member in fluid communication with said hollow body member at one end, said gas intake member including a tubular portion defining at least one lateral aperture;
   an air regulator slidably received by said tubular portion at the other end thereof to controllably cover said lateral aperture;
   an opening defined by said regulator member for receiving a gas supply nozzle;
   a second hollow body member positioned in telescoping relationship with respect to said first hollow body member;
   a third hollow body member positioned in telescoping relationship with respect to said first hollow body member and opposite said second body member, said first, second and third hollow body members including means to effect said telescoping relationship; and
   a plurality of apertures distributed over each said body member.

8. The burner assembly as defined in claim 7 further including adjustable leg member means operatively associated with both said second and third hollow body members.

9. The burner assembly as defined in claim 7 further including adjustable securing means operatively associated with said second and third hollow body members and said first hollow body member.

10. The burner assembly as defined in claim 9 wherein said adjustable securing means is defined by a screw member threadably engaged through a catch plate portion provided by said second and third hollow body member slidably positioned over a guide plate portion provided by said first hollow body member.

11. The burner assembly as defined in claim 10 wherein said first, second and third body members are defined by tubular portions.

12. An improved barbecue gas grill comprising:
   a base member defining a floor portion;
   a first hollow body member;
   a gas intake member in fluid communication with said hollow body member;
   a second hollow body member positioned in telescoping relationship with respect to said first hollow body member;
   a third hollow body member positioned in telescoping relationship with respect to said first hollow body member and opposite said second body member, said first, second and third hollow body members including means to effect said telescoping relationship;
   a plurality of apertures distributed over each said body member; and
   adjustable leg members operatively associated with said second and third hollow body members for contact with said floor portion.

13. The improved gas grill as defined in claim 12 further including adjustable securing means operatively associated with said second and third hollow body members and said first hollow body member.

14. The improved gas grill as defined in claim 13 wherein said adjustable securing means is defined by a screw member threadably engaged through a catch plate portion provided by said second and third hollow body members slidably positioned over a guide plate portion provided by said first hollow body member.

15. The improved gas grill as defined in claim 14 wherein said first, second and third hollow body members are defined by tubular portions.

* * * * *